United States Patent
Hu et al.

(10) Patent No.: US 11,640,152 B2
(45) Date of Patent: May 2, 2023

(54) METHOD AND DEVICE FOR PROVIDING SERVICE FOR A PROGRAMMABLE LOGIC CONTROLLER

(71) Applicant: Siemens Aktiengesellschaft, Munich (DE)

(72) Inventors: Xi Hu, Beijing (CN); Ji Li, Beijing (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 6 days.

(21) Appl. No.: 16/649,842

(22) PCT Filed: Sep. 28, 2017

(86) PCT No.: PCT/CN2017/104002
§ 371 (c)(1),
(2) Date: Mar. 23, 2020

(87) PCT Pub. No.: WO2019/061154
PCT Pub. Date: Apr. 4, 2019

(65) Prior Publication Data
US 2020/0278653 A1 Sep. 3, 2020

(51) Int. Cl.
*G05B 19/05* (2006.01)
(52) U.S. Cl.
CPC .. *G05B 19/056* (2013.01); *G05B 2219/13185* (2013.01)
(58) Field of Classification Search
USPC ........................................................ 700/86
See application file for complete search history.

(56) References Cited

U.S. PATENT DOCUMENTS 7,151,966 B1 * 12/2006 Baier ................... G05B 19/056
700/19
9,965,562 B2 * 5/2018 Lawson ................. G05B 11/01
(Continued)

FOREIGN PATENT DOCUMENTS

| CN | 1710862 A | 12/2005 |
|---|---|---|
| CN | 101388101 A | 3/2009 |

(Continued)

OTHER PUBLICATIONS

International Search Report PCT/ISA/210 for International Application No. PCT/CN2017/104002 filed Sep. 28, 2017.
(Continued)

*Primary Examiner* — Md Azad
(74) *Attorney, Agent, or Firm* — Harness, Dickey & Pierce, P.L.C.

(57) ABSTRACT

Embodiments of the present disclosure provide method and device for providing service for a programmable logic controller (PLC), including: creating a virtual-functional-module-description file including an address of an input channel of a virtual functional module to be created; and creating the virtual functional module in a PLC based on the virtual-functional-module-description file, assigning the address to the input channel of the virtual functional module, and creating a virtual-functional-module-configuration file including a mapping relation between the input channel and an output of a service provider. The present disclosure proposes a concept of a virtual functional module which is used to map data provided by intelligent data sources outside the PLC to input channel of PLC so that the data can be the same as normal input values used by PLC program.

12 Claims, 8 Drawing Sheets

(56) References Cited

U.S. PATENT DOCUMENTS

| | | | |
|---|---|---|---|
| 10,845,786 B2* | 11/2020 | Chauvet | H04L 12/2803 |
| 2003/0061311 A1 | 3/2003 | Lo | |
| 2007/0061455 A1* | 3/2007 | Callaghan | H04L 63/08 |
| | | | 709/225 |
| 2008/0189636 A1* | 8/2008 | Hood | H04L 12/40 |
| | | | 715/771 |
| 2010/0235614 A1* | 9/2010 | Callaghan | G05B 19/05 |
| | | | 713/1 |
| 2014/0088927 A1 | 3/2014 | Cao et al. | |
| 2014/0244823 A1 | 8/2014 | Cornett et al. | |
| 2015/0007713 A1 | 1/2015 | Aki | |
| 2015/0073751 A1 | 3/2015 | Liao et al. | |
| 2016/0197778 A1 | 7/2016 | Jones et al. | |
| 2016/0274552 A1* | 9/2016 | Strohmenger | G06Q 10/06 |
| 2016/0323143 A1* | 11/2016 | Kim | G06F 3/0629 |
| 2017/0103137 A1* | 4/2017 | Lawson | G06F 8/60 |
| 2017/0192871 A1 | 7/2017 | Hara et al. | |
| 2018/0299873 A1 | 10/2018 | Chauvet et al. | |
| 2019/0294137 A1 | 9/2019 | Kawanoue et al. | |
| 2019/0302707 A1 | 10/2019 | Guo et al. | |

FOREIGN PATENT DOCUMENTS

| | | |
|---|---|---|
| CN | 103676937 A | 3/2014 |
| CN | 104049593 A | 9/2014 |
| CN | 104350435 A | 2/2015 |
| CN | 104903793 A | 9/2015 |
| CN | 104956368 A | 9/2015 |
| CN | 104965481 | 10/2015 |
| CN | 105223901 | 1/2016 |
| CN | 105612466 A | 5/2016 |
| CN | 107357243 | 11/2017 |
| GB | 2513456 A | 10/2014 |
| JP | 2005243008 | 9/2005 |
| TW | I438593 | 5/2014 |
| WO | WO 2017064560 A1 | 4/2017 |

OTHER PUBLICATIONS

Extended European Search Report dated Feb. 17, 2021.
Extended European Search Report dated Jun. 7, 2021.
Ghosh et al., "FBMTP: An Automated Fault and Behavioral Anomaly Detection and Isolation Tool for PLC-Controlled Manufacturing Systems," IEE Transactions on Systems, Man, and Cybernetics: Systems vol. 47, No. 12, pp. 3399-3416, Dec. 2016.
International Search Report dated Sep. 25, 2018.
U.S. Office Action for U.S. Appl. No. 16/957,744 dated Dec. 7, 2021.
U.S. Appl. No. 16/957,744, filed Jun. 25, 2020.

* cited by examiner

METHOD AND DEVICE FOR PROVIDING SERVICE FOR A PROGRAMMABLE LOGIC CONTROLLER

PRIORITY STATEMENT

This application is the national phase under 35 U.S.C. § 371 of PCT International Application No. PCT/CN2017/104002 which has an International filing date of Sep. 28, 2017, the entire contents of each of which are hereby incorporated herein by reference.

FIELD

Embodiments of the invention generally relate to the present disclosure relates to programmable logic controller (PLC) technologies, and more particularly, to method and device for providing service for a PLC.

BACKGROUND

PLC is a digital operation system designed specifically for applications in industrial environments. It uses a programmable memory comprising instructions stored thereon upon executing to perform logical operations, sequential control, timing, counting and arithmetic operations to control various types of mechanical equipment or production process through a digital or analog input/output.

As industrial cloud becomes a key transformative technology for industrial, more and more data are collected from various aspects of the industry and saved into the cloud. Based on these big data, some artificial intelligence algorithms can be developed and deployed on the cloud to transform the data into useful information for process control. For example, such an algorithm can be used to determine a process model based on large volume input/output data collected during a long period of process operation and the determined model can be used to advise the set point value or adjust proportional-integral-derivative controller (PID) parameters of a PID controller for adaptive process control.

SUMMARY

The inventors have recognized that at present, only through parameterizing the functional modules or functional blocks during PLC station configuration, some empirical data or data from analytic tools are used to optimize a process control. However, the inventors have discovered that this approach cannot be used to online integrate an external analytic tool or algorithm with the PLC.

To solve the problems in the prior art, embodiments of the present disclosure provide method and device for providing service for a PLC. The technical solutions are as follows:

In one embodiment, a method for creating a virtual functional module of a PLC, comprises:
creating a virtual-functional-module-description file comprising an address of an input channel of a virtual functional module to be created; and
creating the virtual functional module in a PLC based on the virtual-functional-module-description file, assigning the address to the input channel of the virtual functional module, and creating a virtual-functional-module-configuration file comprising a mapping relation between the input channel and an output of a service provider.

In one embodiment, a method for obtaining service from a service provider, which is applied to a PLC comprising a virtual functional module, comprises:
establishing a communication connection with a service provider;
providing the service provider with a mapping relation between an input channel of the virtual functional module and an output of the service provider; and
receiving an output variable from the output of the service provider through the input channel, and updating the value of the input channel with the output variable.

In one embodiment, a method for providing a PLC with service, which is applied to a service provider, comprises:
establishing a communication connection with a PLC comprising a virtual functional module;
obtaining a mapping relation between an input channel of the virtual functional module and an output of the service provider, from the PLC; and
transmitting an output variable to the input channel through the output of the service provider, thus the value of the input channel is updated with the output variable.

In one embodiment, a device for creating a virtual functional module of a PLC, comprises:
a description-file-creating module, configured to create a virtual-functional-module-description file comprising an address of an input channel of a virtual functional module to be created; and
a module-creating module, configured to create the virtual functional module in a PLC based on the virtual-functional-module-description file, assigning the address to the input channel of the virtual functional module, and creating a virtual-functional-module-configuration file comprising a mapping relation between the input channel and an output of a service provider.

In one embodiment, a device for obtaining service from a service provider, which is applied to a PLC comprising a virtual functional module, comprises:
an establishing module, configured to establish a communication connection with a service provider;
a providing module, configured to provide the service provider with a mapping relation between an input channel of a virtual functional module and an output of the service provider; and
a receiving module, configured to receive an output variable from the output of the service provider through the input channel, and to update the value of the input channel with the output variable.

In one embodiment, a device for providing a PLC with service, which is applied to a service provider, comprises:
an establishing module, configured to establish a communication connection with a PLC comprising a virtual functional module;
an obtaining module, configured to obtain a mapping relation between an input channel of the virtual functional module and an output of the service provider, from the PLC; and
a transmitting module, configured to transmit an output variable to the input channel through the output of the service provider, thus the value of the input channel is updated with the output variable.

In one embodiment, a computer-readable medium comprises computer instructions stored thereon, upon executing the computer instructions by a processor, the processor performing the method according to any one of above-mentioned embodiments.

BRIEF DESCRIPTION OF THE DRAWINGS

In order to make technical solutions of examples of the present disclosure clearer, accompanying drawings to be used in description of the examples will be simply introduced hereinafter. Obviously, the accompanying drawings to be described hereinafter are only some examples of the present disclosure. Those skilled in the art may obtain other drawings according to these accompanying drawings without creative labor.

LIST OF REFERENCE NUMBERS

Figure 1:
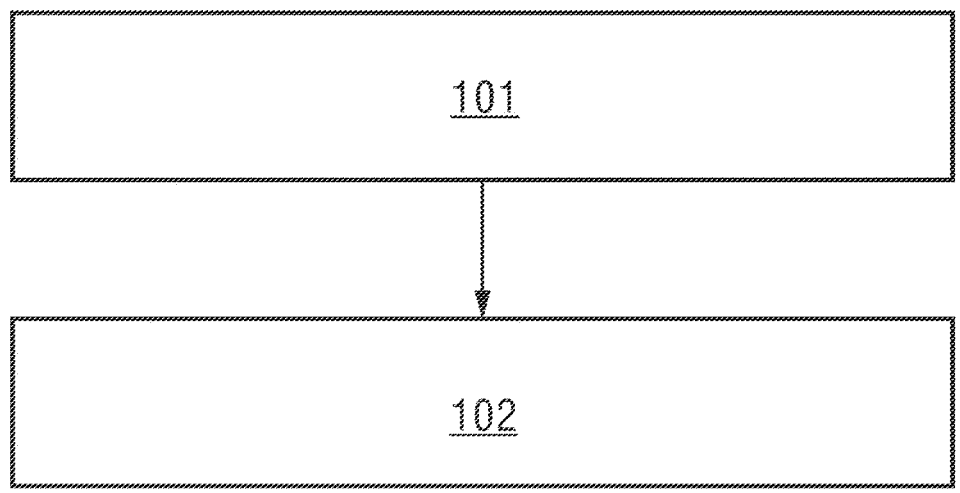
FIG. 1 is a diagram illustrating a method for creating a virtual functional module of a PLC, according to an example embodiment of the present disclosure.

| reference numbers | meanings |
| --- | --- |
| 101~102 | steps |
| 201~203 | steps |
| 301~303 | steps |
| 501~505 | steps |
| 401 | PLC |
| 402 | virtual functional module |
| 403 | service provider |
| 404 | third party database |
| 405 | CPU module |
| 406 | power supply module |
| 407 | I/O module |
| 408 | functional module |
| 601 | description-file-creating module |
| 602 | module-creating module |
| 701 | establishing module |
| 702 | providing module |
| 703 | receiving module |
| 704 | module-creating module |
| 801 | establishing module |
| 802 | obtaining module |
| 803 | transmitting module |

DETAILED DESCRIPTION OF THE EXAMPLE EMBODIMENTS

In one embodiment, a method for creating a virtual functional module of a PLC, comprises:

creating a virtual-functional-module-description file comprising an address of an input channel of a virtual functional module to be created; and creating the virtual functional module in a PLC based on the virtual-functional-module-description file, assigning the address to the input channel of the virtual functional module, and creating a virtual-functional-module-configuration file comprising a mapping relation between the input channel and an output of a service provider.

Therefore, the present disclosure proposes a concept of a virtual functional module of a PLC, which is used to map data provided by service provider (such as an industrial cloud platform or artificial intelligence algorithm) outside the PLC to the input channel of the PLC so that the data provided by the intelligent data sources can be the same as the normal input value used by PLC program.

Preferably, in at least one embodiment, creating the virtual functional module in a PLC based on the virtual-functional-module-description file comprises:

installing the virtual-functional-module-description file into a programming tool of the PLC; and creating the virtual functional module in the PLC through a module catalog provided by the programming tool of the PLC.

Therefore, the present disclosure provides a concrete method for creating a virtual functional module, which is easy to operate and applicable to a variety of application environments.

Preferably, in at least one embodiment, creating a virtual-functional-module-configuration file comprises:

creating a virtual-functional-module-configuration file in the PLC when the virtual functional module is created in the PLC; or creating a virtual-functional-module-configuration file in the programming tool of the PLC when the virtual functional module is created in the PLC, and providing the PLC with the virtual-functional-module-configuration file.

Therefore, the virtual-functional-module-configuration file can be created in PLC or programming tool of the PLC based on user's operating habits, thus a variety of implementations are provided based on the specific application environment.

Preferably, in at least one embodiment, the virtual-functional-module-description file further comprises description information on the service provider.

Therefore, users can easily create corresponding virtual functional module based on the description information on the service provider.

In one embodiment, a method for obtaining service from a service provider, which is applied to a PLC comprising a virtual functional module, comprises:

establishing a communication connection with a service provider;

providing the service provider with a mapping relation between an input channel of the virtual functional module and an output of the service provider; and receiving an output variable from the output of the service provider through the input channel, and updating the value of the input channel with the output variable.

Therefore, a service is obtained from service provider outside the PLC and online integration an external analytic tool or algorithm with PLC has been achieved.

Preferably, in at least one embodiment, the method further comprises:

creating a virtual-functional-module-description file comprising an address of an input channel of a virtual functional module to be created; and creating the virtual functional module in a PLC based on the virtual-functional-module-description file, assigning the address to the input channel of the virtual functional module, and creating a virtual-functional-module-configuration file comprising a mapping relation between the input channel and an output of a service provider;

wherein providing the service provider with a mapping relation between an input channel of a virtual functional module and an output of the service provider comprises:

providing the service provider with the virtual-functional-module-configuration file.

Therefore, the present disclosure proposes a concept of a virtual functional module which is used to map data provided by service provider to the input channel of the PLC so that the data provided by the intelligent data sources can be the same as the normal input value used by PLC program.

Preferably, in at least one embodiment, creating the virtual functional module in a PLC based on the virtual-functional-module-description file comprises:

installing the virtual-functional-module-description file into a programming tool of the PLC; and creating the virtual functional module in the PLC through a module catalog provided by the programming tool of the PLC.

Therefore, the present disclosure provides a concrete method for creating a virtual functional module, which is easy to operate and applicable to a variety of application environments.

Preferably, in at least one embodiment, wherein creating a virtual-functional-module-configuration file comprises:

creating a virtual-functional-module-configuration file in the PLC when the virtual functional module is created in the PLC; or creating a virtual-functional-module-configuration file in the programming tool of the PLC when the virtual functional module is created in the PLC, and providing the PLC with the virtual-functional-module-configuration file.

Therefore, the virtual-functional-module-configuration file can be created in PLC or programming tool of the PLC based on user's operating habits, thus a variety of implementations are provided based on the specific application environment.

In one embodiment, a method for providing a PLC with service, which is applied to a service provider, comprises:

establishing a communication connection with a PLC comprising a virtual functional module;

obtaining a mapping relation between an input channel of the virtual functional module and an output of the service provider, from the PLC; and transmitting an output variable to the input channel through the output of the service provider, thus the value of the input channel is updated with the output variable.

Therefore, a service is provided for a PLC and online integration an external analytic tool or algorithm with PLC has been achieved.

Preferably, in at least one embodiment, the method further comprises:

obtaining historical data of the PLC from a third party database, and executing predetermined application logic based on the historical data to generate the output variable; or obtaining real time data of the PLC from the PLC, and executing predetermined application logic based on real time data of the PLC to generate the output variable; or obtaining historical data of the PLC from a third party database and obtaining real time data of the PLC from the PLC, and executing predetermined application logic based on real time data of the PLC and historical data of the PLC to generate the output variable.

Therefore, the service provider obtains input data from multiple sources to generate output variable with diversity. As a result, a wide variety of output variables can be provided for PLC.

Preferably, in at least one embodiment, the predetermined application logic includes at least one of the followings:

artificial intelligence algorithm; data analysis algorithm; data mining algorithm.

Therefore, artificial intelligence algorithm, data analysis algorithm or data mining algorithm that PLC does not normally possess is provided for PLC, resulting the control ability of PLC is significantly enhanced.

In one embodiment, a device for creating a virtual functional module of a PLC, comprises:

a description-file-creating module, configured to create a virtual-functional-module-description file comprising an address of an input channel of a virtual functional module to be created; and a module-creating module, configured to create the virtual functional module in a PLC based on the virtual-functional-module-description file, assigning the address to the input channel of the virtual functional module, and creating a virtual-functional-module-configuration file comprising a mapping relation between the input channel and an output of a service provider.

Therefore, the present disclosure proposes a concept of a virtual functional module which is used to map data provided by service provider (such as an industrial cloud platform or artificial intelligence algorithm) outside the PLC to the input channel of the PLC so that the data provided by the intelligent data sources can be the same as the normal input value used by PLC program.

Preferably, in at least one embodiment, the module-creating module, configured to install the virtual-functional-module-description file into a programming tool of the PLC and to create the virtual functional module in the PLC through a module catalog provided by the programming tool of the PLC.

Therefore, the present disclosure provides a concrete method for creating a virtual functional module, which is easy to operate and applicable to a variety of application environments.

Preferably, in at least one embodiment, the module-creating module, configured to create a virtual-functional-module-configuration file in the PLC when the virtual functional module is created in the PLC; or to create a virtual-functional-module-configuration file in the programming tool of the PLC when the virtual functional module is created in the PLC, and to provide the PLC with the virtual-functional-module-configuration file.

Therefore, the virtual-functional-module-configuration file can be created in PLC or programming tool of the PLC based on user's operating habits, thus a variety of implementations are provided based on the specific application environment.

Preferably, in at least one embodiment, the virtual-functional-module-description file further comprising description information on the service provider.

Therefore, users can easily create corresponding virtual functional module based on the description information on the service provider.

In one embodiment, a device for obtaining service from a service provider, which is applied to a PLC comprising a virtual functional module, comprises:

an establishing module, configured to establish a communication connection with a service provider;

a providing module, configured to provide the service provider with a mapping relation between an input channel of a virtual functional module and an output of the service provider; and a receiving module, configured to receive an output variable from the output of the service provider through the input channel, and to update the value of the input channel with the output variable.

Therefore, a service is obtained from service provider outside the PLC and online integration an external analytic tool or algorithm with PLC has been achieved.

Preferably, in at least one embodiment, further comprises:

a module-creating module, configured to create a virtual-functional-module-description file comprising an address of an input channel of a virtual functional module, and to create the virtual functional module in the PLC based on the virtual-functional-module-description file, and to assign the address to the input channel of the virtual functional module, and to create a virtual-functional-module-configuration file comprising a mapping relation between the input channel and an output of a service provider; wherein the providing module, configured to provide the service provider with the virtual-functional-module-configuration file.

Therefore, the present disclosure proposes a concept of a virtual functional module which is used to map data provided by service provider to the input channel of the PLC so that the data provided by the intelligent data sources can be the same as the normal input value used by PLC program.

Preferably, in at least one embodiment, the module-creating module, configured to install the virtual-functional-module-description file into a programming tool of the PLC and to create the virtual functional module in the PLC through a module catalog provided by the programming tool of the PLC.

Therefore, the present disclosure provides a concrete method for creating a virtual functional module, which is easy to operate and applicable to a variety of application environments.

Preferably, in at least one embodiment, the module-creating module, configured to create the virtual-functional-module-configuration file in the PLC when the virtual functional module is created in the PLC;

or to create the virtual-functional-module-configuration file in the programming tool of the PLC when the virtual functional module is created in the PLC, and to provide the PLC with the virtual-functional-module-configuration file.

Therefore, the virtual-functional-module-configuration file can be created in PLC or programming tool of the PLC based on user's operating habits, thus a variety of implementations are provided based on the specific application environment.

In one embodiment, a device for providing a PLC with service, which is applied to a service provider, comprises:

an establishing module, configured to establish a communication connection with a PLC comprising a virtual functional module;

an obtaining module, configured to obtain a mapping relation between an input channel of the virtual functional module and an output of the service provider, from the PLC; and a transmitting module, configured to transmit an output variable to the input channel through the output of the service provider, thus the value of the input channel is updated with the output variable.

Therefore, a service is provided for a PLC and online integration an external analytic tool or algorithm with PLC has been achieved.

Preferably, in at least one embodiment, the transmitting module further configured to:

obtain historical data of the PLC from a third party database and execute predetermined application logic based on the historical data to generate the output variable; or obtain real time data of the PLC from the PLC and execute predetermined application logic based on real time data of the PLC to generate the output variable; or obtain historical data of the PLC from a third party database and real time data of the PLC from the PLC and execute predetermined application logic based on real time data of the PLC and historical data of the PLC to generate the output variable.

Therefore, the service provider obtains input data from multiple sources to generate output variables with diversity. As a result, a wide variety of output variables can be provided for PLC.

Preferably, in at least one embodiment, the predetermined application logic comprises at least one of the followings:

artificial intelligence algorithm; data analysis algorithm; data mining algorithm.

Therefore, artificial intelligence algorithm, data analysis algorithm or data mining algorithm that PLC does not normally possess in prior art is provided for PLC, resulting the control ability of PLC is significantly enhanced.

In one embodiment, a computer-readable medium comprises computer instructions stored thereon, upon executing the computer instructions by a processor, the processor performing the method according to any one of above-mentioned embodiments.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

The present disclosure proposes a concept of a virtual functional module of PLC. Essentially, the virtual functional module is not an actual physical module but a virtual module used to map an external algorithm (e.g. an artificial intelligence algorithm) output or any smart data source (e.g. an industrial cloud platform) output to a PLC input channel, so that the external algorithm output or any smart data source output outside of PLC can be used anywhere in PLC program like normal PLC input values.

The virtual functional module may provide a number of digital and/or analog inputs like a normal DI/AI module, and can be used in an almost same way as that of the other normal DI/AI modules during PLC station configuration, programming and commission except that:

(a) Each input channel of the virtual functional module is not a measurement of a physical signal but a mapping of an output variable of an external application or service provider. The output variable value could be from dynamic calculation, or directly got from the internet or intranet;

(b) The input image area of the virtual functional module is updated with the new output values from the application or service during PLC input scan cycle.

In an example embodiment, digital input and 32-bit resolution analog input for a virtual functional module are supported to simplify the implementation. The digital input and 32-bit resolution analog input are mapped from Boolean output variable and integer or float output variable respectively.

FIG. 1 is a diagram illustrating a method for creating a virtual functional module of a PLC, according to an example embodiment of the present disclosure. As shown in FIG. 1, the method may include the following steps.

Step 101: creating a virtual-functional-module-description file comprising an address of an input channel of a virtual functional module to be created.

Step 102: creating the virtual functional module in a PLC based on the virtual-functional-module-description file, assigning the address to the input channel of the virtual functional module, and creating a virtual-functional-module-configuration file comprising a mapping relation between the input channel and an output of a service provider.

Each virtual functional module to be created has a virtual-functional-module-description file which contains an address of an input channel of the virtual functional module to be created. A virtual functional module may have multiple input channels. Correspondingly, the virtual-functional-module-description file of the virtual functional module to be created contains multiple corresponding addresses for the multiple input channels.

Preferably, a virtual-functional-module-description file further comprises description information on its associated service provider, such as description of service functionalities and output variables.

In an embodiment of the present disclosure, creating a virtual functional module in a PLC based on the virtual-functional-module-description file comprises: installing the virtual-functional-module-description file into a programming tool of the PLC; and creating the virtual functional module in the PLC through a module catalog provided by the programming tool of the PLC.

Therefore, the present disclosure provides a concrete method for creating a virtual functional module, which is easy to operate and applicable to a variety of application environments.

Specifically, after installing the virtual-functional-module-description file into a PLC programming tool, the corresponding virtual functional module will be available in a module catalog for station configuration. The engineer selects the virtual functional module from the module catalog window and put it into a PLC station, and then assigns addresses to the input channels of the virtual functional module respectively.

In an embodiment of the present disclosure, creating a virtual-functional-module-configuration file comprises: creating a virtual-functional-module-configuration file in the PLC when the virtual functional module is created in the PLC.

Specifically, after creating the virtual functional module and assigning the address to the input channel of the virtual functional module on the PLC side, a mapping relation between the input channel and output of the service provider associated with the description information is set up by an engineer on the PLC side. The engineer on the PLC side may create a virtual-functional-module-configuration file comprising the mapping relation and stores the file in CPU module of the PLC, for later fetching by the associated service provider.

In an alternative embodiment of the present disclosure, creating a virtual-functional-module-configuration file comprises: creating a virtual-functional-module-configuration file in the programming tool of the PLC when the virtual functional module is created in the PLC, and providing the PLC with the virtual-functional-module-configuration file.

Specifically, after creating the virtual functional module and assigning the address to the input channel of the virtual functional module on the PLC side, a mapping relation between the input channel and output of the service provider associated with the description information is set up by an engineer on the programming tool side. The engineer on the programming tool side may create a virtual-functional-module-configuration file comprising the mapping relation in the programming tool. The programming tool then sends the virtual-functional-module-configuration file to the PLC.

Therefore, the virtual-functional-module-configuration file can be created in PLC or programming tool of the PLC based on user's operating habits, thus a variety of implementations are provided based on specific application environments.

After creating a virtual functional module in a PLC based on the above description, the PLC can obtain service from an external service provider through the virtual functional module.

Figure 2:
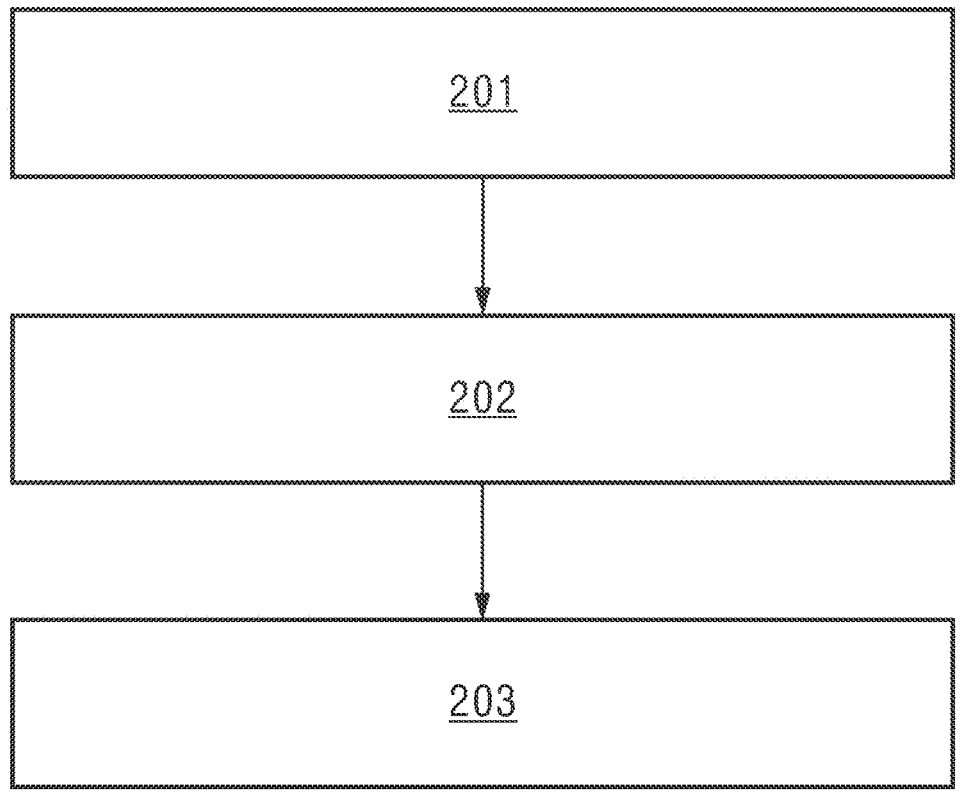
FIG. 2 is a diagram illustrating a method for obtaining service from a service provider, according to an example embodiment of the present disclosure.

The present disclosure provides a method for obtaining service from a service provider. FIG. 2 is a diagram illustrating a method for obtaining service from a service provider, according to an example embodiment of the present disclosure. The method is applied to a PLC comprising a virtual functional module created based on the above description.

As shown in FIG. 2, the method may include the following steps.

Step 201: establishing a communication connection with a service provider.

In particular, the PLC may establish a communication connection with the service provider based on any open industrial protocol, for example, object linking and embedding for process control unified architecture ("OPC UA").

Step 202: providing the service provided with a mapping relation between an input channel of the virtual functional module and an output of the service provider.

Here, the service provider obtains a virtual-functional-module-configuration file from the PLC based on the communication connection. The virtual-functional-module-configuration file contains a mapping relation between the input channel of the virtual functional module and the output of the service provider. After obtaining the virtual-functional-module-configuration file, the service provider can obtain the mapping relation between the input channel of the virtual functional module and the output of the service provider by parsing the virtual-functional-module-configuration file. Then, service provider may output a corresponding output variable to the input channel of the PLC.

Step 203: receiving an output variable from the output of the service provider through the input channel, and updating the value of the input channel with the output variable.

Here, PLC is responsible for synchronizing the update of the input image area with the new arrived output variable to PLC input scan cycle.

In an embodiment, the method includes in advance a process of creating a virtual functional module in the PLC, comprising: creating a virtual-functional-module-description file comprising an address of an input channel of a virtual functional module to be created; and creating the virtual functional module in a PLC based on the virtual-functional-module-description file, assigning the address to the input channel of the virtual functional module, and creating a virtual-functional-module-configuration file comprising a mapping relation between the input channel and an output of a service provider, wherein providing the service provider with a mapping relation between an input channel of a virtual functional module and an output of the service provider comprises: providing the service provider with the virtual-functional-module-configuration file.

In an embodiment of the present disclosure, creating the virtual functional module in a PLC based on the virtual-functional-module-description file comprises: installing the virtual-functional-module-description file into a programming tool of the PLC; and creating the virtual functional module in the PLC through a module catalog provided by the programming tool of the PLC.

In an embodiment of the present disclosure, creating a virtual-functional-module-configuration file comprises:

creating a virtual-functional-module-configuration file in the PLC when the virtual functional module is created in the PLC.

In an alternative embodiment of the present disclosure, creating a virtual-functional-module-configuration file comprises: creating a virtual-functional-module-configuration file in the programming tool of the PLC when the virtual functional module is created in the PLC, and providing the PLC with the virtual-functional-module-configuration file.

In summary, the virtual-functional-module-configuration file contains the mapping relation between an input channel of the virtual functional module and an output of the service provider, the data provided by service provider (such as an industrial cloud platform or artificial intelligence algorithm) outside the PLC is mapped to the input channel of the PLC so that the data provided by the intelligent data sources can be the same as the normal input value used by PLC program.

After creating a virtual functional module in a PLC based on the above description, the PLC can be provided with external service.

Figure 3:
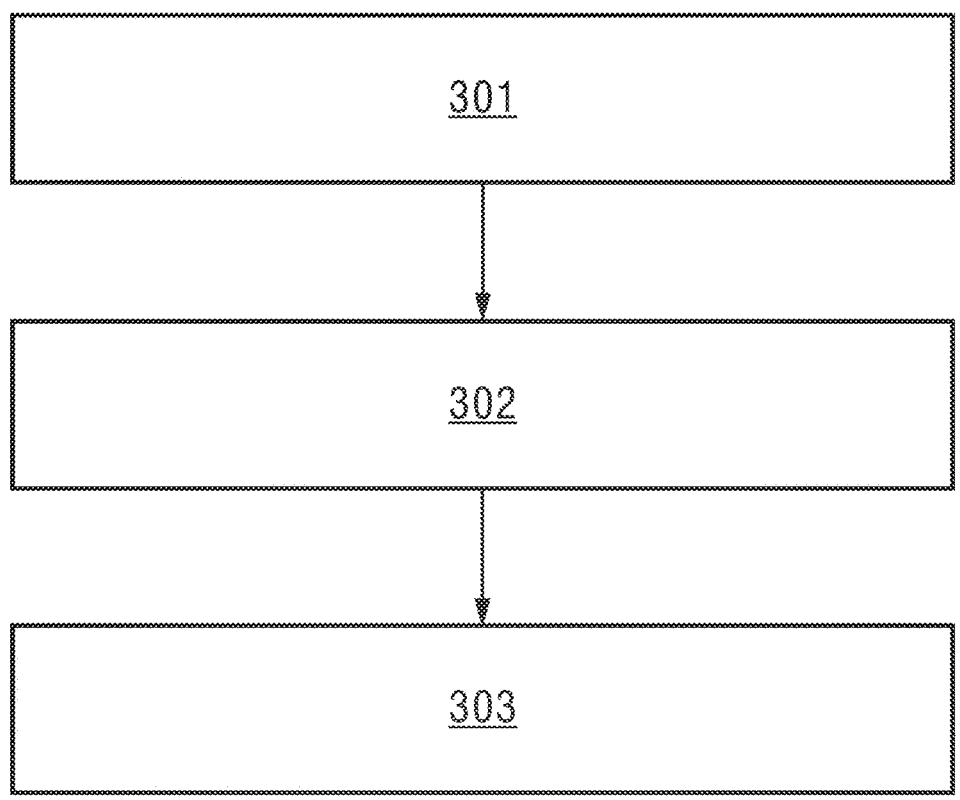
FIG. 3 is a diagram illustrating a method for providing a PLC with service, according to an example embodiment of the present disclosure.

The present disclosure provides a method for providing a PLC with service. FIG. 3 is a diagram illustrating a method for providing a PLC with service, which is applied to a service provider, according to an example embodiment of the present disclosure. The PLC comprises a virtual functional module created based on the above description.

As shown in FIG. 3, the method may include the following steps.

Step 301: establishing a communication connection with a PLC comprising a virtual functional module.

Step 302: obtaining a mapping relation between an input channel of the virtual functional module and an output of the service provider, from the PLC.

Step 303: transmitting an output variable to the input channel through the output of the service provider, thus the value of the input channel is updated with the output variable.

Therefore, external service is provided for a PLC and online integration an external analytic tool or algorithm with PLC has been achieved.

In an embodiment of the present disclosure, the method further comprises: obtaining historical data of the PLC from a third party database and executing predetermined application logic based on the historical data to generate the output variable. In this aspect, a communication connection between PLC and a third party database is pre-established. With this communication connection, historical data of the PLC is sent periodically or no periodically to the third party database. The service provider then uses the historical data to perform predetermined application logic to generate an output variable.

In an embodiment of the present disclosure, the method further comprises: obtaining real time data of the PLC from the PLC, and executing predetermined application logic based on real time data of the PLC to generate the output variable. In this aspect, PLC sends its real time data to the service provider. The service provider uses the real time data to perform predetermined application logic to generate an output variable.

In an embodiment of the present disclosure, the method further comprises: obtaining historical data of the PLC from a third party database and obtaining real time data of the PLC from the PLC, and executing predetermined application logic based on real time data of the PLC and historical data of the PLC to generate the output variable. In this aspect, a communication connection between PLC and the third party database is pre-established. With this communication connection, historical data of the PLC is sent periodically or no periodically to the third party database. Moreover, PLC sends its real time data to the service provider. The service provider combines the real time data and historical data to perform predetermined application logic to generate an output variable.

Therefore, the service provider obtains input data from multiple sources to generate output variables with diversity. As a result, a wide variety of output variables can be provided for PLC.

Preferably, predetermined application logic comprises at least one of the followings: artificial intelligence algorithm; data analysis algorithm; data mining algorithm.

A typical example of application logic has been described above illustratively, and those skilled in the art will appreciate that such description is example only and is not intended to limit the scope of protection of the embodiments of the invention.

Figure 4:
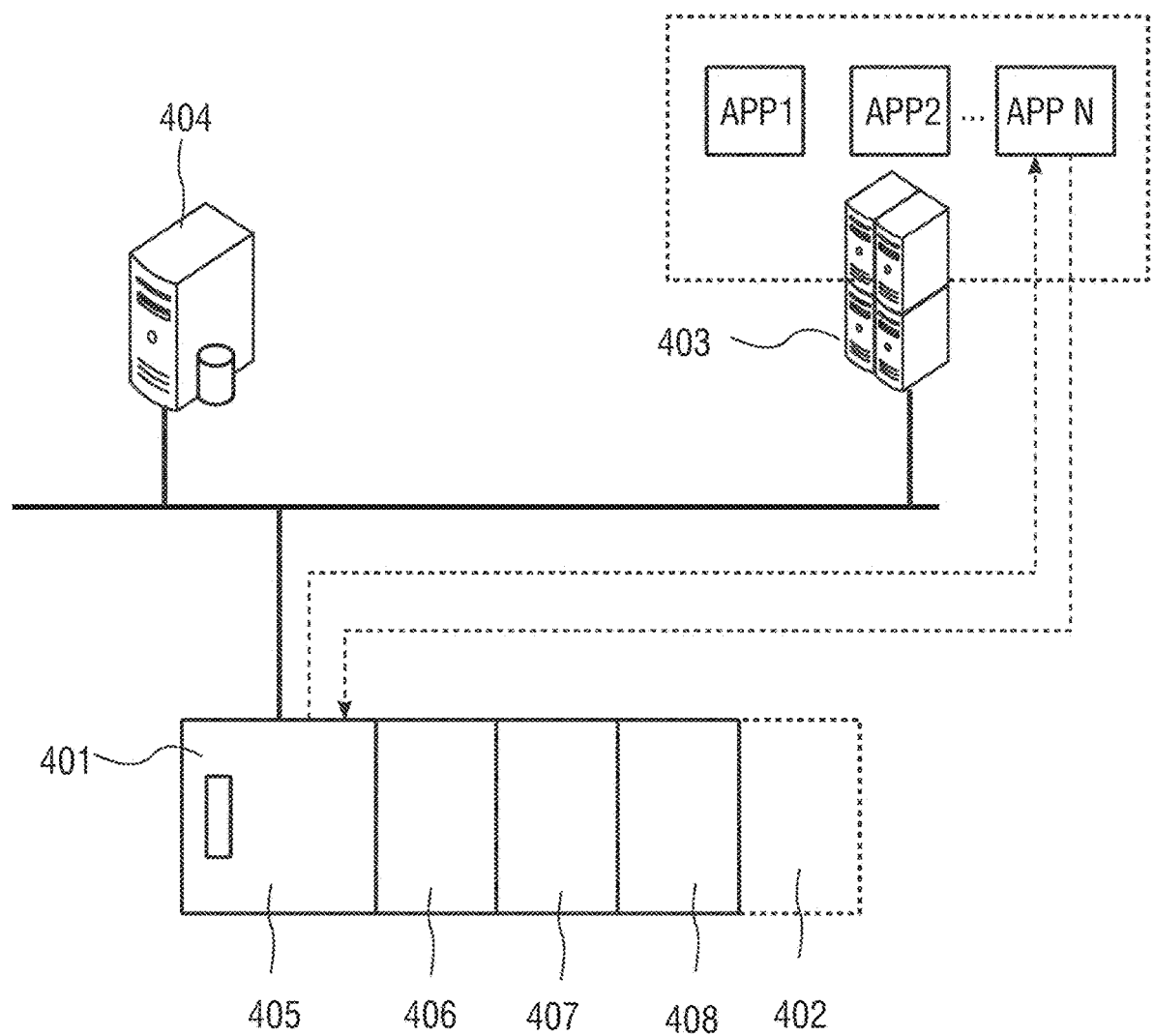
FIG. 4 is a diagram illustrating a system structure for providing a PLC with service, according to an example embodiment of the present disclosure.

FIG. 4 is a diagram illustrating a system structure for providing a PLC with service, according to an example embodiment of the present disclosure.

As shown in FIG. 4, PLC 401 comprises a CPU module 405, a power supply module 406, an I/O module 407 and a functional module 408. Moreover, the PLC 401 also comprises one or more virtual functional modules 402. A communication connection between PLC 401 and a third party database 404 is pre-established. Historical data of the PLC 401 is sent periodically to the third party database 404 through the communication connection.

A service provider 403 is deployed on a personal computer ("PC"), a server or any cloud computing resource connected to the PLC 401's network. The service provider 403 mainly consists of two parts, one part is application logic, and the other is communication stub which is responsible for communicating with PLC 401. The communication stub is developed based on open industrial protocols, e.g. OPC UA, and can be reused by various such service providers through changing its configuration, such as the mapping information between its outputs and the input channels of the corresponding virtual functional modules, the internet protocol ("IP") address and sub network mask of the PLC 401 to communicate, etc. The service provider 403 contains multiple specific algorithms, such as APP1, APP2, APP3 . . . and APPN. A virtual functional module 402 has a mapping relation with any one or more algorithms. The data provided by the mapping algorithm is mapped to the corresponding input channel of the virtual functional module 402, so that the data provided by the mapping algorithm can be used by a program of the PLC program as a normal input value.

After startup, the service provider 403 establishes communication connection with PLC 401 and gets the mapping information between its output variables and the input channels of the corresponding virtual functional modules 402, and then executes the application logic. The application logic may be executed cyclically or just one time. The time point of writing the new output values to PLC 401 is application dependent, and PLC 401 is responsible for synchronizing the update of the input image area with the new arrived output values to PLC input scan cycle.

Figure 5:
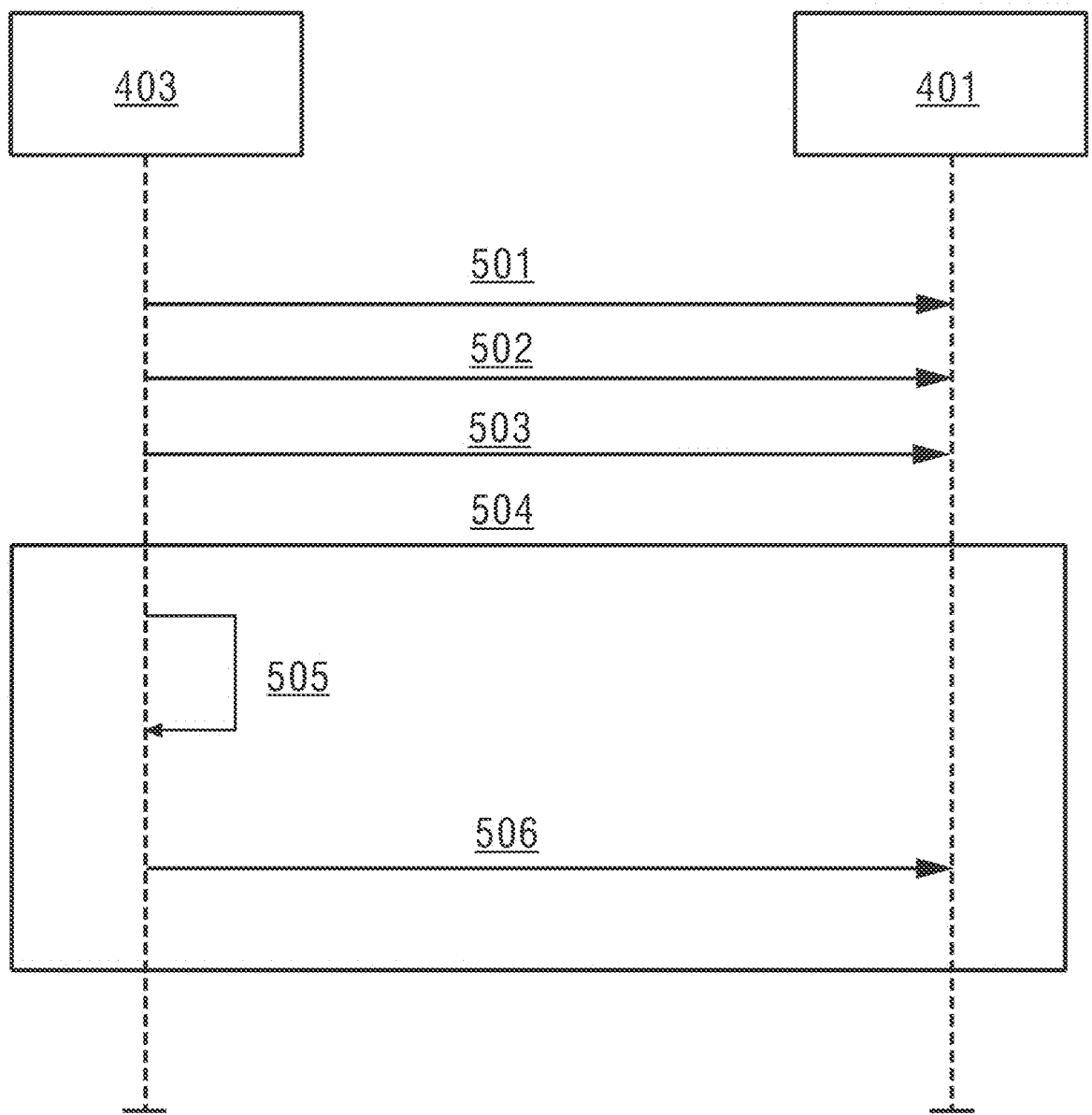
FIG. 5 is a diagram illustrating an interactive process for providing a PLC with service in FIG. 4, according to an example embodiment of the present disclosure.

FIG. 5 is a diagram illustrating an interactive process for providing PLC 401 with service in FIG. 4, according to an example embodiment of the present disclosure.

As shown in FIG. 5, the process comprising the followings steps.

Step 501: Service provider 403 establishes a communication connection with PLC 401.

Step 502: Service provider 403 fetches a virtual-functional-module-configuration file comprising a mapping relation between an input channel of a virtual functional module 402 and an output of service provider 403 (such as APP1), from PLC 401.

Step 503: Service provider 403 obtains real time data from PLC 402.

Step 504: Service provider 403 loop executes a data update processing which comprises step 505 and step 506.

Step 505: Service provider 403 executes the application logic to generate output variables. To the above example, APP1 uses the real time data of the PLC 402 to run its own logic to generate output variables.

Step 506: Service provider 403 transmitting output variables to the input channel through the output of the service provider, thus the value of the input channel is updated with the output variable. Here, to the above example, service provider 403 transmits output variables generated by APP1 to the input channel of PLC 402. PLC 402 is responsible for synchronizing the update of the input image area with the new arrived output values to PLC input scan cycle.

Based on above description, the present disclosure also proposes a device structure for creating a virtual functional module of PLC.

Figure 6:
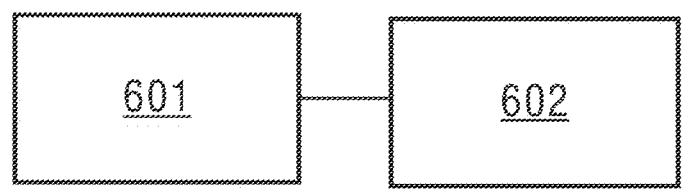
FIG. 6 is a diagram illustrating a device structure for creating a virtual functional module of a PLC, according to an example embodiment of the present disclosure.

FIG. 6 is a diagram illustrating a device structure for creating a virtual functional module of PLC, according to an example embodiment of the present disclosure.

As shown in FIG. 6, a device for creating a virtual functional module of a PLC, comprises:

a description-file-creating module 601, configured to create a virtual-functional-module-description file comprising an address of an input channel of a virtual functional module to be created; and a module-creating module 602, configured to create the virtual functional module in a PLC based on the virtual-functional-module-description file, assigning the address to the input channel of the virtual functional module, and creating a virtual-functional-module-configuration file comprising a mapping relation between the input channel and an output of a service provider.

Therefore, the present disclosure proposes a concept of a virtual functional module which is used to map data provided by service provider (such as an industrial cloud platform or artificial intelligence algorithm) outside the PLC to the input channel of the PLC so that the data provided by the intelligent data sources can be the same as the normal input value used by PLC program.

Preferably, wherein module-creating module 602, configured to install the virtual-functional-module-description file into a programming tool of the PLC, and to create the virtual functional module in the PLC through a module catalog provided by the programming tool of the PLC. Therefore, the present disclosure provides a concrete method for creating a virtual functional module, which is easy to operate and applicable to a variety of application environments.

Preferably, module-creating module 602, is configured to create a virtual-functional-module-configuration file in the PLC when the virtual functional module is created in the PLC.

Preferably, module-creating module 602, is configured to create a virtual-functional-module-configuration file in the programming tool of the PLC when the virtual functional module is created in the PLC, and to provide the PLC with the virtual-functional-module-configuration file.

Therefore, the virtual-functional-module-configuration file can be created in PLC or programming tool of the PLC based on user's operating habits, thus a variety of implementations are provided based on the specific application environment. Preferably, wherein the virtual-functional-module-description file further comprising description information on the service provider. Therefore, users can easily create corresponding virtual functional module based on the description information on the service provider.

Figure 7:
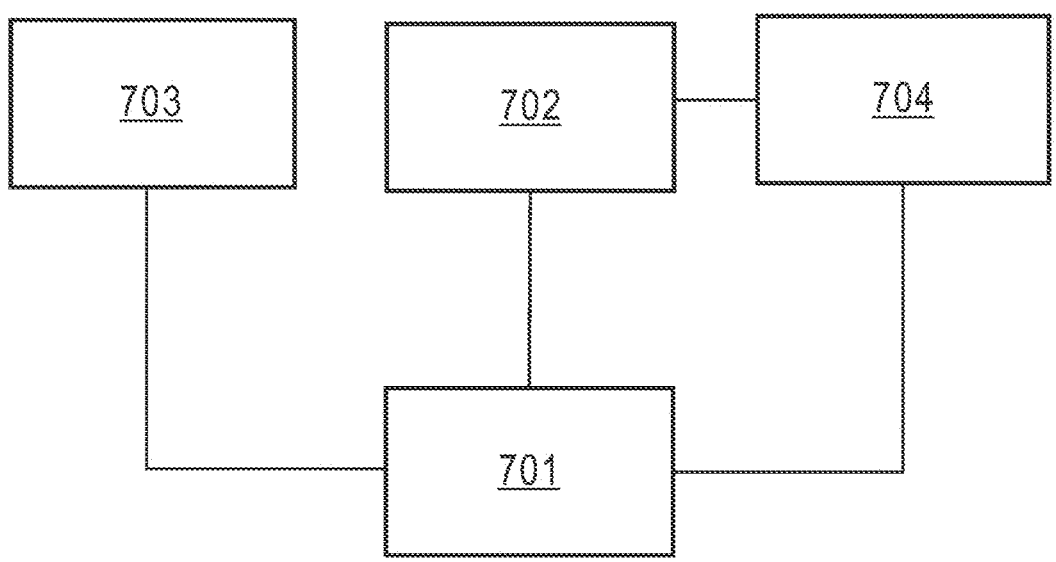
FIG. 7 is a diagram illustrating a device structure for obtaining service from a service provider, according to an example embodiment of the present disclosure.

FIG. 7 is a diagram illustrating a device structure for obtaining service from a service provider, according to an example embodiment of the present disclosure.

As shown in FIG. 7, a device for obtaining service from a service provider, which is applied to a PLC comprising a virtual functional module, comprises:

an establishing module 701, configured to establish a communication connection with a service provider;

a providing module 702, configured to provide the service provider with a mapping relation between an input channel of a virtual functional module and an output of the service provider; and a receiving module 703, configured to receive an output variable from the output of the service provider through the input channel, and to update the value of the input channel with the output variable.

Therefore, a service is obtained from service provider outside the PLC and online integration an external analytic tool or algorithm with PLC has been achieved.

Preferably, an embodiment further comprises: a module-creating module 704, configured to create a virtual-functional-module-description file comprising an address of an input channel of a virtual functional module, and to create the virtual functional module in the PLC based on the virtual-functional-module-description file, and to assign the address to the input channel of the virtual functional module, and to create a virtual-functional-module-configuration file comprising a mapping relation between the input channel and an output of a service provider; wherein the providing module, configured to provide the service provider with the virtual-functional-module-configuration file. Therefore, the present disclosure proposes a concept of a virtual functional module which is used to map data provided by service provider to the input channel of the PLC so that the data provided by the intelligent data sources can be the same as the normal input value used by PLC program.

Preferably, module-creating module 704, is configured to install the virtual-functional-module-description file into a programming tool of the PLC, and to create the virtual functional module in the PLC through a module catalog provided by the programming tool of the PLC. Therefore, the present disclosure provides a concrete method for creating a virtual functional module, which is easy to operate and applicable to a variety of application environments.

Preferably, module-creating module 704, is configured to create the virtual-functional-module-configuration file in the PLC when the virtual functional module is created in the PLC; or to create the virtual-functional-module-configuration file in the programming tool of the PLC when the virtual functional module is created in the PLC, and to provide the PLC with the virtual-functional-module-configuration file. Therefore, the virtual-functional-module-configuration file can be created in PLC or programming tool of the PLC based on user's operating habits, thus a variety of implementations are provided based on the specific application environment.

Figure 8:
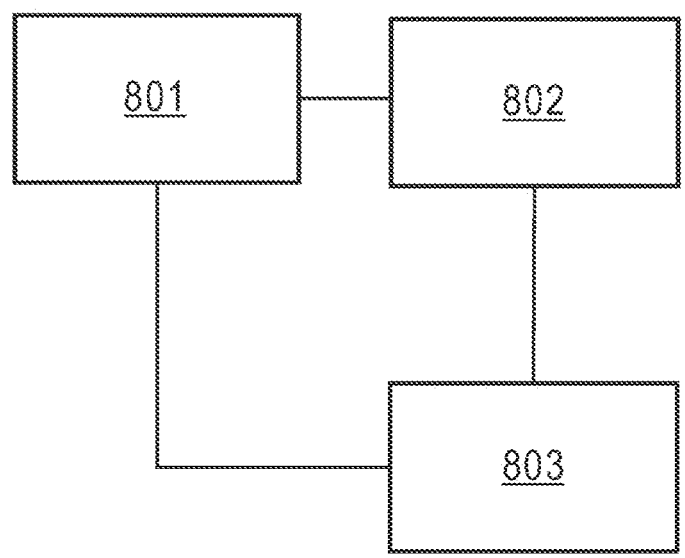
FIG. 8 is a diagram illustrating a device structure for providing a PLC with service, according to an example embodiment of the present disclosure.

FIG. 8 is a diagram illustrating a device structure for providing a PLC with service, according to an example embodiment of the present disclosure.

As shown in FIG. 8, a device structure for providing a PLC with service, according to an example embodiment of the present disclosure, is applied to a service provider. The device comprises an establishing module 801, configured to establish a communication connection with a PLC comprising a virtual functional module;

an obtaining module 802, configured to obtain a mapping relation between an input channel of the virtual functional module and an output of the service provider, from the PLC; and a transmitting module 803, configured to transmit an output variable to the input channel through the output of the service provider, thus the value of the input channel is updated with the output variable.

Therefore, service is provided for a PLC and online integration an external analytic tool or algorithm with PLC has been achieved.

Preferably, the transmitting module 803 is further configured to:

obtain historical data of the PLC from a third party database and execute predetermined application logic based on the historical data to generate the output variable; or obtain real time data of the PLC from the PLC and execute predetermined application logic based on real time data of the PLC to generate the output variable; or obtain historical data of the PLC from a third party database and real time data of the PLC from the PLC and execute predetermined application logic based on real time data of the PLC and historical data of the PLC to generate the output variable.

Therefore, the service provider obtains input data from multiple sources to generate output variable with diversity. As a result, a wide variety of output variables can be provided for PLC.

The present disclosure discloses a computer-readable medium comprising computer instructions stored thereon, upon executing the computer instructions by a processor, the processor performing an embodiment of the above methods. In particular, it may provide a system or apparatus equipped with a storage medium on which software program codes for realizing the functions of any of the above-described embodiments are stored, and a computer (or a CPU or an MPU of the system or apparatus) reads out and executes the program code stored in the storage medium. In this case, the program code itself read from the storage medium can realize the function of any one of the above-described embodiments, and thus the program code and the storage medium storing the program code constitute a part of the present disclosure.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure. The non-transitory storage medium includes a hard disk, a floppy disk, a magnetic disk, a compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for creating a virtual functional module in a programmable logic controller, the method comprising:

creating, by the programmable logic controller, a virtual-functional-module-description file including an address of an input channel of the virtual functional module to be created;

creating, by the programmable logic controller, the virtual functional module in the programmable logic controller based on the virtual-functional-module-description file, the virtual functional module being programmed to map an external algorithm output or a smart data source output to the programmable logic controller so that the external algorithm output or the smart data source output outside the programmable logic controller is usable in the same manner as normal programmable logic controller input values;

assigning, by the programmable logic controller, the address to the input channel of the virtual functional module; and creating, by the programmable logic controller, a virtual-functional-module-configuration file including a mapping relation between the input channel and an output of a service provider, the service provider being separate from the programmable logic controller, and the service provider containing multiple algorithms.

2. The method of claim 1, wherein the creating of the virtual functional module in the programmable logic controller based on the virtual-functional-module-description file comprises:

installing the virtual-functional-module-description file into a programming tool of the programmable logic controller; and creating the virtual functional module in the programmable logic controller through a module catalog provided by the programming tool of the programmable logic controller.

3. The method of claim 2, wherein the creating of the virtual-functional-module-configuration file comprises at least one of:

creating the virtual-functional-module-configuration file in the programmable logic controller upon the virtual functional module being created in the programmable logic controller; or creating the virtual-functional-module-configuration file in the programming tool of the programmable logic controller upon the virtual functional module being created in the programmable logic controller, and providing the programmable logic controller with the virtual-functional-module-configuration file.

4. The method of claim 1, wherein the virtual-functional-module-description file includes description information on the service provider.

5. The method of claim 1, further comprising:

establishing, by the programmable logic controller, a communication connection between the virtual functional module and the service provider;

providing, by the programmable logic controller, the service provider with the mapping relation between the input channel of the virtual functional module and the output of the service provider;

receiving, by the programmable logic controller, an output variable from the output of the service provider through the input channel; and updating, by the programmable logic controller, a value of the input channel with the output variable.

6. The method of claim 5, wherein the providing of the service provider with the mapping relation between the input channel of the virtual functional module and the output of the service provider includes providing the service provider with the virtual-functional-module-configuration file.

7. The method of claim 6, wherein the creating of the virtual functional module in the programmable logic controller based on the virtual-functional-module-description file comprises:

installing the virtual-functional-module-description file into a programming tool of the programmable logic controller; and creating the virtual functional module in the programmable logic controller through a module catalog provided by the programming tool of the programmable logic controller.

8. The method of claim 7, wherein the creating of the virtual-functional-module-configuration file comprises:

creating the virtual-functional-module-configuration file in the programmable logic controller upon the virtual functional module being created in the programmable logic controller; or creating the virtual-functional-module-configuration file in the programming tool of the programmable logic controller upon the virtual functional module being created in the programmable logic controller, and providing the programmable logic controller with the virtual-functional-module-configuration file.

9. A non-transitory computer-readable medium, storing computer instructions, wherein upon executing the computer instructions by a processor, the processor is configured to perform the method of claim 1.

10. A non-transitory computer-readable medium, storing computer instructions, wherein upon executing the computer instructions by a processor, the processor is configured to perform the method of claim 2.

11. A non-transitory computer-readable medium, storing computer instructions, wherein upon executing the computer instructions by a processor, the processor is configured to perform the method of claim 3.

12. A non-transitory computer-readable medium, storing computer instructions, wherein upon executing the computer instructions by a processor, the processor is configured to perform the method of claim 4.

* * * * *